(12) United States Patent
McDonald et al.

(10) Patent No.: US 10,829,400 B2
(45) Date of Patent: Nov. 10, 2020

(54) MANIFOLD 3-STAGE WATER FILTRATION SYSTEM WITH HEAVY METALS REMOVAL

(71) Applicants: Robert Ramsey McDonald, Holland, MI (US); Harry Joseph Knopke, Grand Rapids, MI (US); Jon Harold Bechtel, Holland, MI (US)

(72) Inventors: Robert Ramsey McDonald, Holland, MI (US); Harry Joseph Knopke, Grand Rapids, MI (US); Jon Harold Bechtel, Holland, MI (US)

(73) Assignee: Aqua Clara International Incorporated, Holland, MI (US)

( * ) Notice: Subject to any disclaimer, the term of this patent is extended or adjusted under 35 U.S.C. 154(b) by 368 days.

(21) Appl. No.: 15/559,692

(22) PCT Filed: Mar. 20, 2015

(86) PCT No.: PCT/US2015/021642
§ 371 (c)(1),
(2) Date: Sep. 19, 2017

(87) PCT Pub. No.: WO2016/153458
PCT Pub. Date: Sep. 29, 2016

(65) Prior Publication Data
US 2018/0050945 A1 Feb. 22, 2018

(51) Int. Cl.
*C02F 9/00* (2006.01)
*B01D 63/02* (2006.01)
(Continued)

(52) U.S. Cl.
CPC .............. *C02F 9/00* (2013.01); *B01D 61/142* (2013.01); *B01D 65/08* (2013.01); *C02F 1/001* (2013.01);
(Continued)

(58) Field of Classification Search
CPC .. B01D 19/0057; B01D 21/26; B01D 21/267; B01D 53/24; B01D 2257/60;
(Continued)

(56) References Cited

U.S. PATENT DOCUMENTS 2,723,761 A 11/1955 Van Der Made et al.
3,814,247 A * 6/1974 Hirs ....................... B01D 24/12
210/793

(Continued)

FOREIGN PATENT DOCUMENTS

| JP | 2011031121 | * | 2/2011 |
| WO | 00/21633 | | 4/2000 |
| WO | 2012025943 | | 3/2012 |

OTHER PUBLICATIONS

English language machine translation of JP2011031121, 9 pages, No Date.*

(Continued)

*Primary Examiner* — Pranav N Patel
(74) *Attorney, Agent, or Firm* — Gardner, Linn, Burkhart & Ondersma LLP (57) ABSTRACT

A manifolded 3-stage water filtration system includes a deep sand filter assembly, a hydro-cyclone, and a filter and valve manifold assembly fluidly coupled together. The filter and valve manifold assembly includes a pre-filter fluidly coupled with the hydro-cyclone, a first hollow membrane filter fluidly coupled with the pre-filter, a second hollow membrane filter fluidly coupled with the pre-filter and the first hollow membrane filter, and a backwash system. The backwash system includes valves fluidly coupled with pipe sections, the pre-filter, and the first and second hollow membrane filters. Selected valves are closable so that clean water flows from one of the first and the second hollow membrane filters to the other of the first and second hollow membrane filters. Material occluding the other of the first (Continued)

hollow membrane filter and the second hollow membrane filter is removed by the clean water without adding contaminants to the filter.

20 Claims, 8 Drawing Sheets

(51) Int. Cl.

| | | |
|---|---|---|
| *B01D 61/14* | (2006.01) | |
| *B01D 65/08* | (2006.01) | |
| *C02F 1/00* | (2006.01) | |
| C02F 1/28 | (2006.01) | |
| C02F 101/10 | (2006.01) | |
| C02F 101/20 | (2006.01) | |
| C02F 3/04 | (2006.01) | |
| C02F 1/38 | (2006.01) | |
| C02F 1/44 | (2006.01) | |
| B01D 61/16 | (2006.01) | |

(52) U.S. Cl.
CPC .............. *B01D 61/16* (2013.01); *B01D 63/02* (2013.01); *B01D 2311/2649* (2013.01); *C02F 1/281* (2013.01); *C02F 1/385* (2013.01); *C02F 1/44* (2013.01); *C02F 3/04* (2013.01); *C02F 2101/103* (2013.01); *C02F 2101/20* (2013.01); *C02F 2201/005* (2013.01); *C02F 2303/16* (2013.01); *C02F 2307/10* (2013.01); *Y02W 10/15* (2015.05)

(58) Field of Classification Search
CPC ............ B01D 2257/62; B01D 2201/04; B01D 2201/18; B01D 2201/188; B01D 23/61; B01D 65/08; B01D 61/142; B01D 61/16; B01D 61/18; B01D 61/20; B01D 61/22; B01D 63/02; B01D 63/04; B01D 63/046; B01D 69/08; B01D 29/50; B01D 29/56; B01D 29/60; B01D 29/62; C02F 1/001; C02F 1/385; C02F 1/44; C02F 2101/20; C02F 2201/005

See application file for complete search history.

(56) References Cited

U.S. PATENT DOCUMENTS

| | | | | |
|---|---|---|---|---|
| 5,059,317 | A * | 10/1991 | Marius ................... | B01D 61/04 210/202 |
| 5,112,483 | A * | 5/1992 | Cluff ...................... | B01D 36/02 210/223 |
| 5,417,848 | A * | 5/1995 | Erdmannsdorfer .. | B01D 17/045 210/232 |
| 6,099,735 | A * | 8/2000 | Kelada ................... | B01D 61/08 210/134 |
| 6,174,437 | B1 | 1/2001 | Haney | |
| 2003/0132167 | A1* | 7/2003 | Haase ..................... | C02F 1/008 210/696 |
| 2004/0173532 | A1* | 9/2004 | Scharstuhl ............. | B01D 61/16 210/650 |
| 2005/0269254 | A1 | 12/2005 | Roitman | |
| 2006/0151393 | A1* | 7/2006 | Badger .................. | B01D 61/04 210/652 |
| 2010/0044286 | A1* | 2/2010 | Menju ..................... | C02F 9/00 210/96.1 |
| 2013/0015137 | A1 | 1/2013 | Urmenyi et al. | |
| 2013/0334137 | A1 | 12/2013 | Seibert et al. | |
| 2014/0014579 | A1* | 1/2014 | Haruna ................... | C02F 9/00 210/636 |

OTHER PUBLICATIONS

Hua et al.; Journal of Hazardous Materials 211-212 (2012) 317-331, Heavy metal removal from water/wastewater by nanosized metal oxides: A review. (Year: 2012).*

Adel A. Ismail, Ayman A. El-Midany, Ibrahim A. Ibrahim, Hideyuki Matsunaga, Heavy metal removal using SiO2-TiO2 binary oxide: experimental design approach, Adsorption (2008) 14: 21-29. (Year: 2008).*

International Search Report and Written Opinion dated Jul. 27, 2015 for corresponding International PCT Application No. PCT/US2015/021642.

* cited by examiner

TABLE I - WATER PURIFICATION MODULES

By Application, Raw Water Source, and Contaminants

| Application | Module Type | Treatment Type | Raw Water | Output Capacity (lpd) | Contaminant | Output Water Quality | Principal Components |
|---|---|---|---|---|---|---|---|
| Household | I | Filtration/Bio-Reactor | Surface Water, Well | 40-200 | Bacteria, Sediments | WHO Standards | Sand Filtration, Bio-reactor |
| | II | Bifurcated Filtration | Municipal Water | 150 | Bacteria | 99.9999% Bacteria Removal | Bifurcated Filtration |
| | III | Bifurcated Filtration, As[1] Treatment Reactor | Municipal Water | 150 | Bacteria, Arsenic | 99.9999% Bacteria Removal | Bifurcated Filtration, As Adsorption |
| | IV | Filtration, HM[2] Treatment | Surface Water, Well | 50-200 | Heavy Metals | < 5 ppb As | Pre-Filtration, HM Adsorber |
| | V | Bio-reactor, As Treatment | Surface Water, Well | 50-200 | Bacteria, Sediments, Arsenic | WHO Standards, < 5 ppb Arsenic | Bio-Reactor, Internal As Adsorption |
| Facility | I | Bio-Filtration | Surface Water, Well | 1000-10,000 | Bacteria, Sediments | 99.9999% Bacteria Removal | 3-Stage Bio-Filter[3], Single Manifold |
| | II | Filtration, As Treatment | Surface Water, Well | 1000-10,000 | Bacteria, Sediments, HM | 99.9999% Bacteria Removal, < 5 ppb Arsenic | 3-stage Bio-Filter[3], Single Manifold, As Reactor |
| Industrial | I | Bio-Filtration | Surface Water, Well | 20,000-40,000 | Bacteria, Sediments | 99.9999% Bacteria Removal | Electric Pumps, 3-Stage Bio-Filter[3], Single Manifold |
| | II | Bio-filtration, As Reactor | Surface Water, Well | 20,000-40,000 | Bacteria, sediments, HM | 99.9999% Bacteria Removal, < 5 ppb HM | Electric Pumps, 3-Stage Bio-Filter[3], HM Adsorber, Duplex Manifold |
| | In-Line | As Reactor | Any Source With HM | 1-100 | HM | < 5 ppb As | |

[1] As = Arsenic
[2] HM = Heavy Metals, including As
[3] Off-Site Prefabricated Components, Transport to Site and Assemble

FIG. 6

MANIFOLD 3-STAGE WATER FILTRATION SYSTEM WITH HEAVY METALS REMOVAL

CROSS REFERENCE TO RELATED APPLICATION

The present invention is a § 371 national stage of International Application PCT/US2015/021642, filed Mar. 20, 2015, which is hereby incorporated herein by reference in its entirety.

BACKGROUND

The invention relates to a water purification system for treating water characterized by elevated concentrations of contaminants into water that is safe for human consumption.

Potable water is essential for life. Reliable sources of untreated, potable water are today virtually nonexistent. This is particularly true in undeveloped countries. Water sources in such countries frequently contain pathogenic microorganisms at concentrations that far exceed widely accepted drinking water standards. The World Health Organization estimates that approximately 1.2 billion people worldwide are without clean water, and 2.6 billion are without proper sanitation. Furthermore, U.S. AID notes that, in many countries, 80% of illnesses in the population is due to water-borne pathogens. Because of their immature immune systems, children in developing countries under 5 years of age are particularly impacted by fecal polluted water: 1 child in 5 dies, and 2 of the remaining 4 children are permanently disabled. Complicating the problem is the presence of heavy metals in water sources. These contaminants may have a long-term impact on human health that is every bit as severe as the diseases produced by pathogenic microorganisms.

Developed countries have responded to a limited availability of potable water sources by erecting water treatment facilities that can provide potable water in sufficient quantities, and at reasonably affordable costs, to a human population that may exceed many tens of thousands. Such facilities are affordable, in part, due to an economy of scale. The larger the population served by a water treatment facility, and consequently the larger the facility, the more economical such facilities become per capita. Furthermore, developed countries generally have, or have access to, natural resources for facility construction and exploitation of necessary energy sources.

In undeveloped countries, where populations, i.e. villages, settlements, etc., may be relatively isolated and small, appropriately scaled conventional water treatment facilities will generally be too expensive. Large water treatment facilities offering economy of scale may nevertheless be uneconomical for small and/or rural populations. Furthermore, resources for development and operation of a conventional state-of-the-art treatment facility may generally not be available to a small local population. This may be the case particularly with respect to the energy required to operate a conventional treatment facility. Meanwhile, the adverse effects of non-potable water on human health continue.

There is a need for water purification systems that are easily scalable to a local population, utilize readily available materials for construction, are relatively simple to construct and operate, and are readily adaptable to address a range of contaminants.

BRIEF DESCRIPTION OF THE INVENTION

A manifolded 3-stage water filtration system includes a deep sand filter assembly, a hydro-cyclone a filter and valve manifold assembly fluidly coupled together, followed by a single-stage heavy metals reactor containing a mixture of media that will remove heavy metals contamination. The filter and valve manifold assembly includes a pre-filter fluidly coupled with the hydro-cyclone, a first hollow membrane filter fluidly coupled with the pre-filter, a second hollow membrane filter fluidly coupled with the pre-filter and the first hollow membrane filter, and a backwash system. The backwash system includes valves fluidly coupled with pipe sections, the pre-filter, and the first and second hollow membrane filters. Selected valves are closable so that clean water flows from one of the first and the second hollow membrane filters to the other of the first and second hollow membrane filters. Material occluding the other of the first hollow membrane filter and the second hollow membrane filter is removed by the clean water without adding contaminants to the filter. This manifolded hollow membrane assembly feeds water to the last filter, the single-stage heavy metals reactor, where the media it contains removes the heavy metal contamination.

BRIEF DESCRIPTION OF THE DRAWINGS

In the drawings:

FIG. 6 is a tabular summary of embodiments of the manifolded 3-stage water filtration system and heavy metals reactor categorized by user population size, module type, water treatment type, raw water source, treated water output capacity, raw water contaminants, and principal filtration system components.

DETAILED DESCRIPTION OF THE INVENTION

Figure 1:
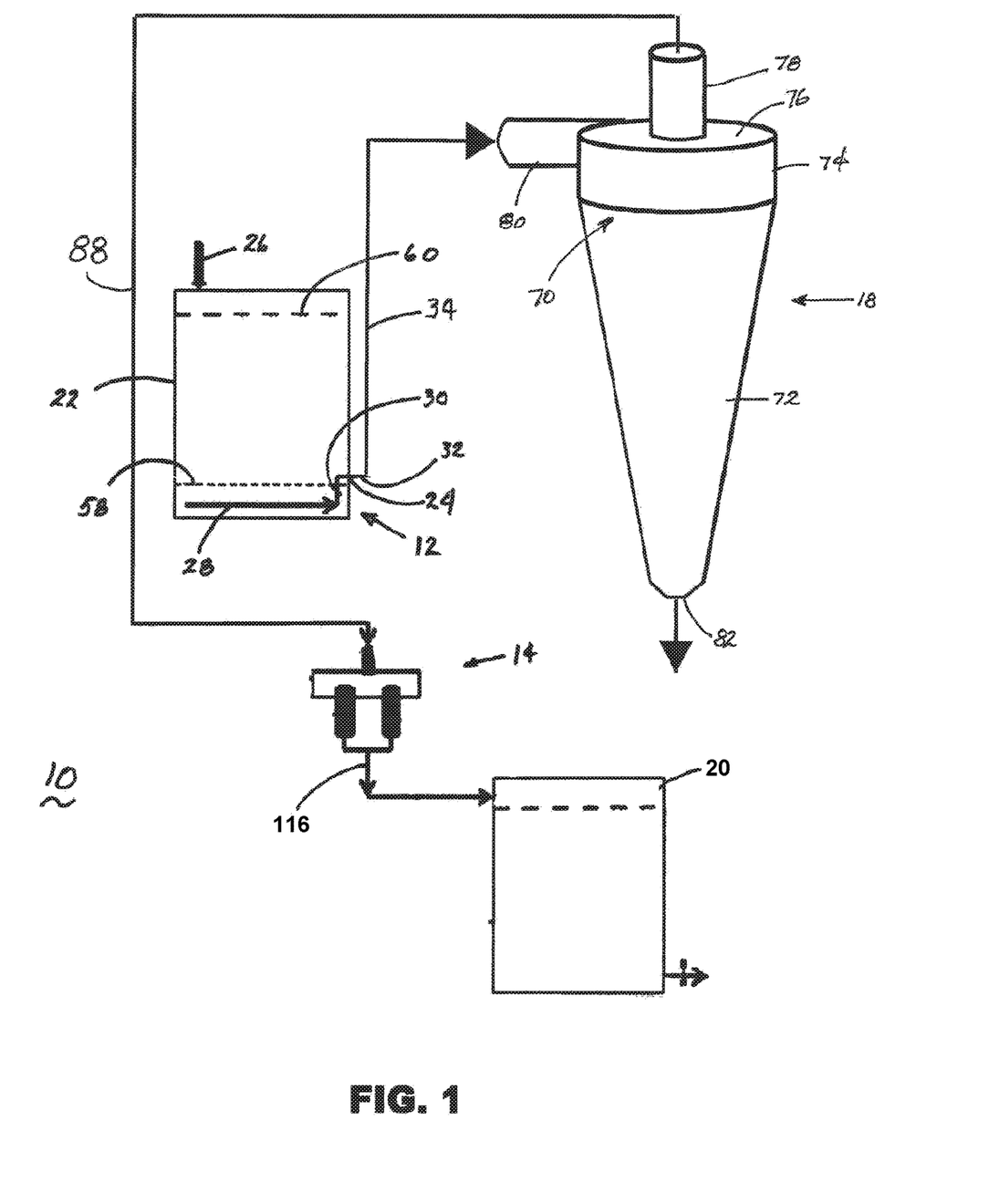
FIG. 1 is a schematic view of an exemplary manifolded 3-stage water filtration system comprising a deep sand filter, a hydro-cyclone, and a filter and valve manifold assembly, according to a first embodiment of the invention.

The invention is described and illustrated herein in the context of exemplary embodiments of a water purifier comprising a manifolded 3-stage water filtration system 10, which may hereinafter be referred to as "the system 10." Referring to FIG. 1, the system 10 may comprise 3 stages, including a deep sand filtration assembly 12, a hydro-cyclone 18, and a filter and valve manifold assembly 14. Each of the 3 stages may provide mechanical separation of contaminants from water. The 3 stages may be fluidly coupled together for converting contaminated raw water into water satisfying applicable drinking water standards. Optionally, a single-stage heavy metals reactor 20, illustrated in FIG. 5 and described hereinafter, may be fluidly coupled into the system 10 to remove heavy metals that may be present in the raw water.

Deep sand filtration may collect particulates within a filter media to thereby discharge a relatively clean outlet flow of liquid. This may enable contaminated water to serve as a feed stock for the system 10.

The deep sand filtration assembly 12 may comprise a raw water tank 22 having a discharge outlet 24 at a height above the bottom of the tank 22 of about 25 cm, and a raw water inlet 26. The raw water tank 22 may be elevated in order to develop a head that may provide a suitable flow of water through the system 10. The raw water tank 22 may be a vessel having a suitable volume for a selected discharge of clean water. The tank 22 may be available locally, e.g. a previously utilized drum, and may comprise materials, e.g. plastic, high-density polyethylene (HDPE), steel, concrete, or a combination of materials, having a suitable strength and durability for the purposes described herein.

A raw water collection pipe 28 may be located across the bottom of the tank 22, transitioning to a vertical pipe 30, in turn transitioning to a discharge pipe 32 extending through the discharge outlet 24. A uniform layer, e.g. a 15 cm thickness, of fine sand 58, e.g. a 0.25 mm-0.35 mm particle size, may be placed in the bottom of the raw water tank 22, covering the raw water collection pipe 28.

Deep sand filtration works by collecting particulates within the filter media, and passing a clean outlet flow of fluid through the discharge pipe 32, thus permitting singularly contaminated water to be a feed stock of the system 10, and generating singularly clean water at relatively low cost. When the sand bed 58 may become clogged with extraneous materials, the sand may be simply drained from the raw water tank 22 and discarded. A 15 cm layer of fine sand 58 may be added to the raw water tank 22 to replace the sand layer removed. This process may continue indefinitely.

A bio-film may form on the surfaces of each sand grain. This may reduce the apparent porosity of the sand bed 58 to less than 80 microns. Thus, the sand bed 58 may operate as a bio-reactor, facilitating removal of all bacterial species from the system 10 at the conclusion of stage 3 filtration, while continuing to perform a filtration function. A description of a sand bed bioreactor is set forth in US Patent Application Publication No. US2012/0175310 of McDonald et al., which is incorporated by reference as though set forth fully herein. In addition, particulate solids may be prevented from being captured by surface charge repulsion if the surface charge of the sand may be of the same sign (positive or negative) as that of the particulate solid. Furthermore, captured particulates may be dislodged from the sand bed 58, although they may be re-captured at a greater depth within the sand bed 58.

A sand grain that is contaminated with particulate solids may become more attractive to additional particulate solids. This may occur if the particle loses surface charge due to its adhesion to the sand grain. Alternatively, if surface charge is maintained, the sand grain may tend to repel additional particulate solids, preventing additional particulates from attaching to the sand grain. Thus, deep sand filtration may be effective in mechanically separating a majority of undesirable materials from raw water. However, water discharged from the deep sand filtration assembly 12 may nevertheless contain materials requiring further reduction through the $2^{nd}$ and $3^{rd}$ stages. A hydro-cyclone 18 may be utilized in the $2^{nd}$ stage downstream of the deep sand filtration assembly 12 to provide further reduction of undesirable materials.

Figure 2:
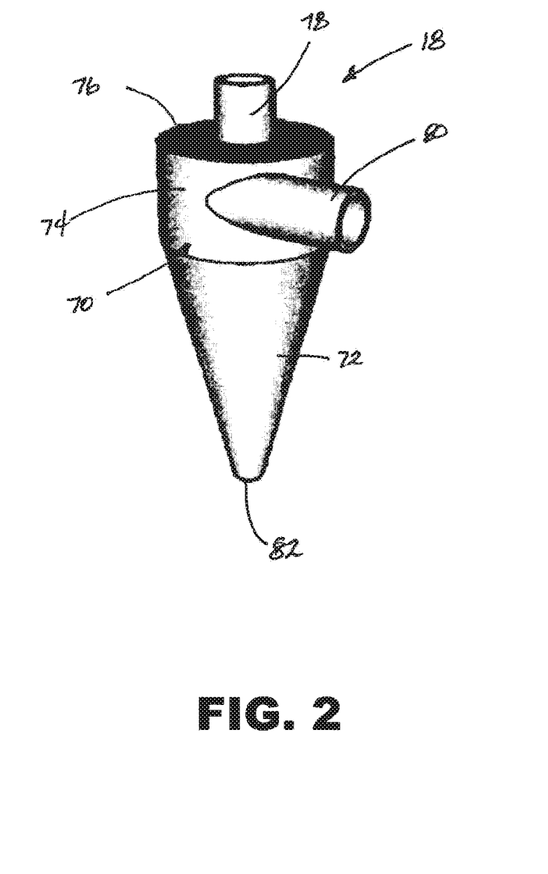
FIG. 2 is a perspective view of the hydro-cyclone comprising part of the exemplary manifolded 3-stage water filtration system illustrated in FIG. 1.

Referring also to FIG. 2, the hydro-cyclone 18 may be a classifier that may be characterized by two opposing outlets concentrically disposed on the longitudinal axis: a smaller outlet for discharge of particulate materials and water at one end, and a larger outlet for discharge of relatively clean water at the opposite end. The small outlet discharge may generally contain a denser or coarser fraction of particulates, while the large outlet discharge may contain a lighter or finer fraction of particulates.

The hydro-cyclone 18 may be characterized by a hollow shell-like hydro-cyclone body 70 having a configuration adapted for a selected inflow and outflow of liquid. The hydro-cyclone body 70 may comprise a hollow conical section 72 transitioning to a hollow inlet section 74. The inlet section 74 may comprise a generally annular, or ring-like, body having a diameter equal to the diameter of the "base" of the conical section 72, concentrically disposed with the conical section 72.

The inlet section 74 may transition to a concentrically disposed circular plate-like top wall 76 that, in turn, may transition to a concentrically disposed circular outlet conduit 78 extending outwardly therefrom. An opposite end of the outlet conduit 78 may penetrate, and extend away from, the top wall 76 a short distance into the interior of the hydro-cyclone body 70. The conical section 72, inlet section 74, and top wall 76 may be coupled together to form a watertight hydro-cyclone body 70.

An annular inlet conduit 80 may be tangentially coupled with the inlet section 74 in such a manner as to provide fluid-tight continuity of the inlet conduit 80 with the inlet section 74. The apex, or "tip," of the conical section 72 may comprise an opening into the interior of the hydro-cyclone body 70 to define a solids discharge outlet 82. In use, the hydro-cyclone 18 may be oriented so that segregated particulate material may be discharged through the discharge outlet 82 under the force of gravity. The discharge outlet 82 may be provided with a discharge gate (not shown) that may be selectively opened and closed for removal of accumulated particulate material.

Figure 3:
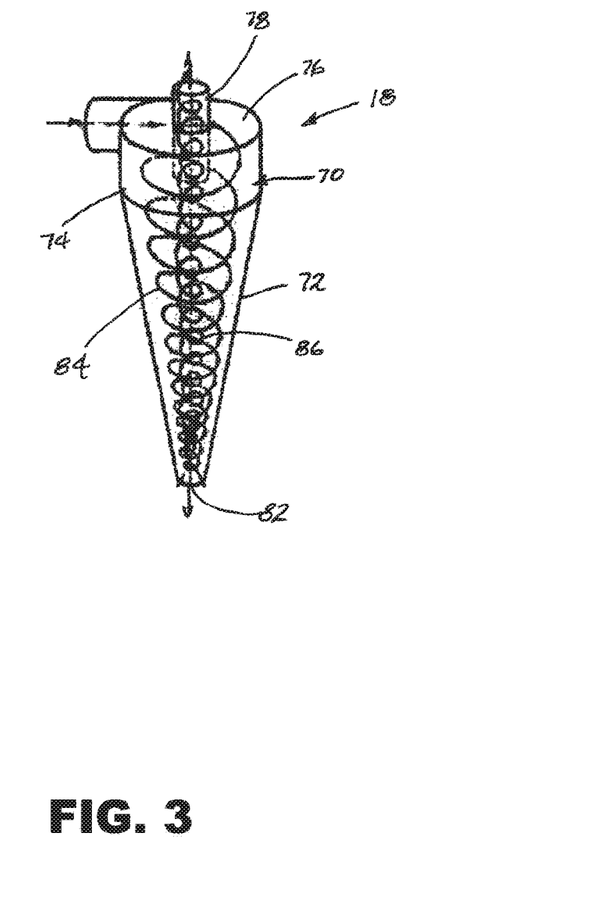
FIG. 3 is a rotated transparent perspective view of the interior of the hydro-cyclone of FIG. 2 illustrating the internal flow of a mixture of water and suspended particulates.

Referring also to FIG. 3, the hydro-cyclone 18 may impart a swirling motion 84 to a flow of water and suspended particulates entering the top of the hydro-cyclone 18 through the inlet conduit 80. Notwithstanding the resulting centripetal forces, higher density coarse particulates may descend 84 to the "tip" of the conical section 72. These particulates may be eliminated from the hydro-cyclone 18 by discharging the accumulated material through the solids discharge outlet 82. This discharge of particulates may be accomplished without any interruption of the incoming water flow. As a result, a flow 86 of relatively clean water may be continuously discharged from adjacent the discharge outlet 82 through the outlet conduit 78. Clean water may flow from the outlet conduit 78 to the filter and valve manifold assembly 14 through a suitable coupling 88.

Operation of the hydro-cyclone 18 may be dependent upon only two primary parameters: properties, such as the physical characteristics and velocity of the feed stream, and the geometry of the hydro-cyclone. The relevant physical characteristics of the feed stream may include size distribution of solids in the feed stream, contaminant density (percent solids in the feed stream), contaminant viscosity, and pressure at the inlet conduit 80. The geometry of the hydro-cyclone 18 may include the inlet conduit shape and area, hydro-cyclone dimensions such as cone angle, cylindrical section length, and total length of the hydro-cyclone, the inlet conduit configuration, the vortex configuration, and the apex or discharge outlet 82 diameter.

The flow of liquid through the interior of the hydro-cyclone 18 may give rise to inertia that may be opposed by the resistance of the liquid. In such a case, larger or denser particles may be transported to the wall of the hydro-cyclone 18 and eventually discharged from the discharge outlet 82 with a limited amount of liquid. Concurrently, the finer or less dense particles may remain in the liquid to exit the hydro-cyclone 18 through the outlet conduit 78. The hydro-cyclone 18 may remove particulates greater than 50 micrometers in size from the primary treated water stream. The hydro-cyclone 18 may have no moving parts (other than, for example, a discharge gate).

Hydro-cyclones may be made of steel, ceramic, or plastic, including polymers such as polyurethane and polypropylene. Metal or ceramic hydro-cyclones may be used for situations requiring more strength, or durability in terms of heat or pressure. When there may be an occurrence of excessive abrasion, such as by sand particles, polyurethanes may be preferred over metals or ceramics. Composite materials may also be utilized. For example, metal hydro-cyclones lined with polyurethane may be used in cases of combined abrasion and high pressure.

The next method of mechanical separation may comprise hollow membrane micro filters whose performance may be critically dependent upon 1) the quality of the feed water from deep sand filtration and a hydro-cyclone, 2) the on-going maintenance of the membrane filters that supports the integrity of the porosity of the filter membrane, e.g. regular cleaning of the filter membranes via a backwash procedure, and 3) the avoidance of caking of the porous membranes when they may dry out after use with water containing a relatively high concentration of water-borne salts.

Figure 4:
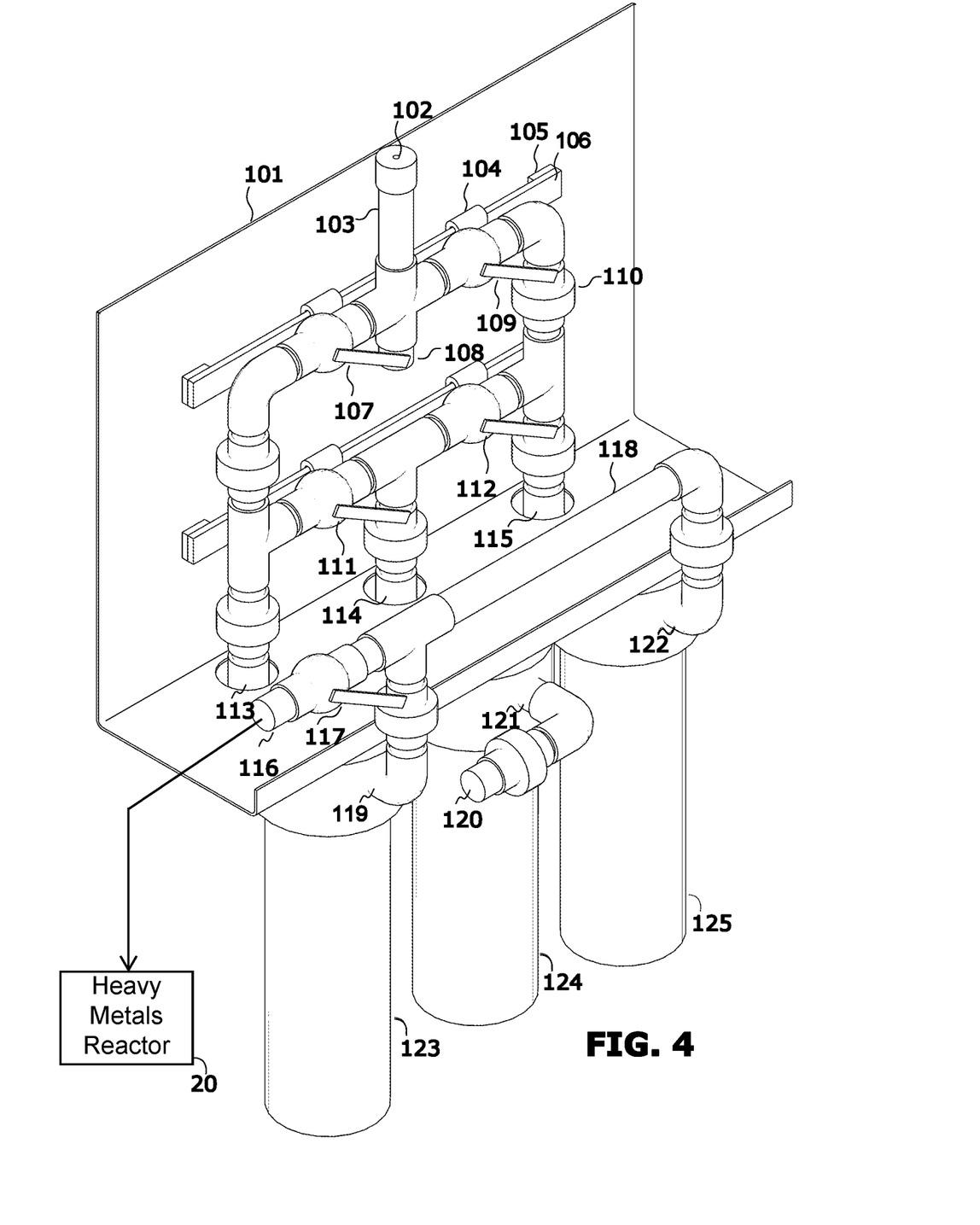
FIG. 4 is a perspective view of an exemplary filter and valve manifold assembly comprising part of the exemplary manifolded 3-stage water filtration system illustrated in FIG. 1.

FIG. 4 illustrates a filter and valve manifold assembly 14 that may supply between 1,000 and 10,000 liters per day of water that is substantially free of bacteria.

As with the deep sand filtration assembly and the hydro-cyclone, materials for construction of the filter and valve manifold assembly may be readily obtained, and may include feed and storage vessels (200-500 liter capacity), wood, metal and bricks utilized as foundation and structural members, mechanical pumps, hydraulic system plumbing, PVC pipe, hydraulic system manifolds, control valves, sand for sand beds/mechanical filtration, metal oxides such as $SiO_2$ and/or mixtures of sand and $SiO_2$, roughing filters for initial mechanical filtration, polishing filters for final mechanical filtration, and/or polishing filters with backwash capabilities.

The exemplary embodiment described hereinafter may be based upon a range of water capacities that may vary based upon supply pressure and filter capacities. The unit may include hollow membrane filters 123, 125. These filters normally operate in parallel and may remove particles that are larger than 0.1 microns. This assures that substantially all of the bacteria may be removed. Alternatively, finer filters may be used depending on the application. However, they may require greater pressure to maintain an adequate flow rate, which may render their use impracticable for filtering water from a supply tank that may provide as little as 80 centimeters of head.

A filter 124 may be utilized as a pre-filter or roughing filter to remove particles of relatively large sizes, thus prolonging the lives of the fine filters 123, 125, and to lessen the number of back-wash cycles that may be required. The filter and valve manifold assembly 14 may include a back plate 101 that may be made from aluminum and that is convenient to mount to a wall or other structure. The back plate 101 may also provide support to the valve and manifold assembly 14 and may provide a mounting surface to which the filters 123, 124, 125 maybe mounted. This may provide a compact and robust assembly, with the valves configured for convenient access and use during normal filtering and back-wash operations.

A drain (not shown) that maybe used to dispose of water used in the back-wash operation is connected to back-wash drain outlet connection 108. Water to be filtered enters the system at a supply water inlet pipe 120 and is routed first to an inlet 121 of the roughing pre-filter 124. Pre-filtered water leaves the roughing pre-filter 124 at outlet 114 and when valve 111 is open, it flows to inlet 113 of fine filter 123; also, when valve 112 is open, it flows to inlet 115 of fine filter 125. Filtered water flows out of filter 123 at outlet 119 and flows out of filter 125 at outlet 122. Pipe 118 serves as a manifold to collect clean water flowing from both fine filters 123, 125. In normal operation clean water supply valve 117 is open so that the filtered water flows from manifold 118 into the clean water supply pipe 116. During normal operation valves 107, 109 are closed so that no water flows to back-wash drain that is connected at output drain connection 108 and valves 111, 112 are both open so that water from the rouging pre-filter 124 flows in parallel through both of the fine filters into output manifold 118 and through open valve 117 to the clean water supply line connected to clean water outlet pipe 116.

The flow capacity of the fine filters 123, 125 is improved and the useful life of the filters is increased by running clean water in reverse through each fine filter, preferably one filter at a time. This may flush debris from the inlet side of the filter that is being back-washed to a drain (not shown). Providing more than one fine filter may enable a first fine filter to be used to provide clean water to back-wash a second fine filter, thus avoiding the need for special clean water storage during the back-wash operation.

Figure 4A:
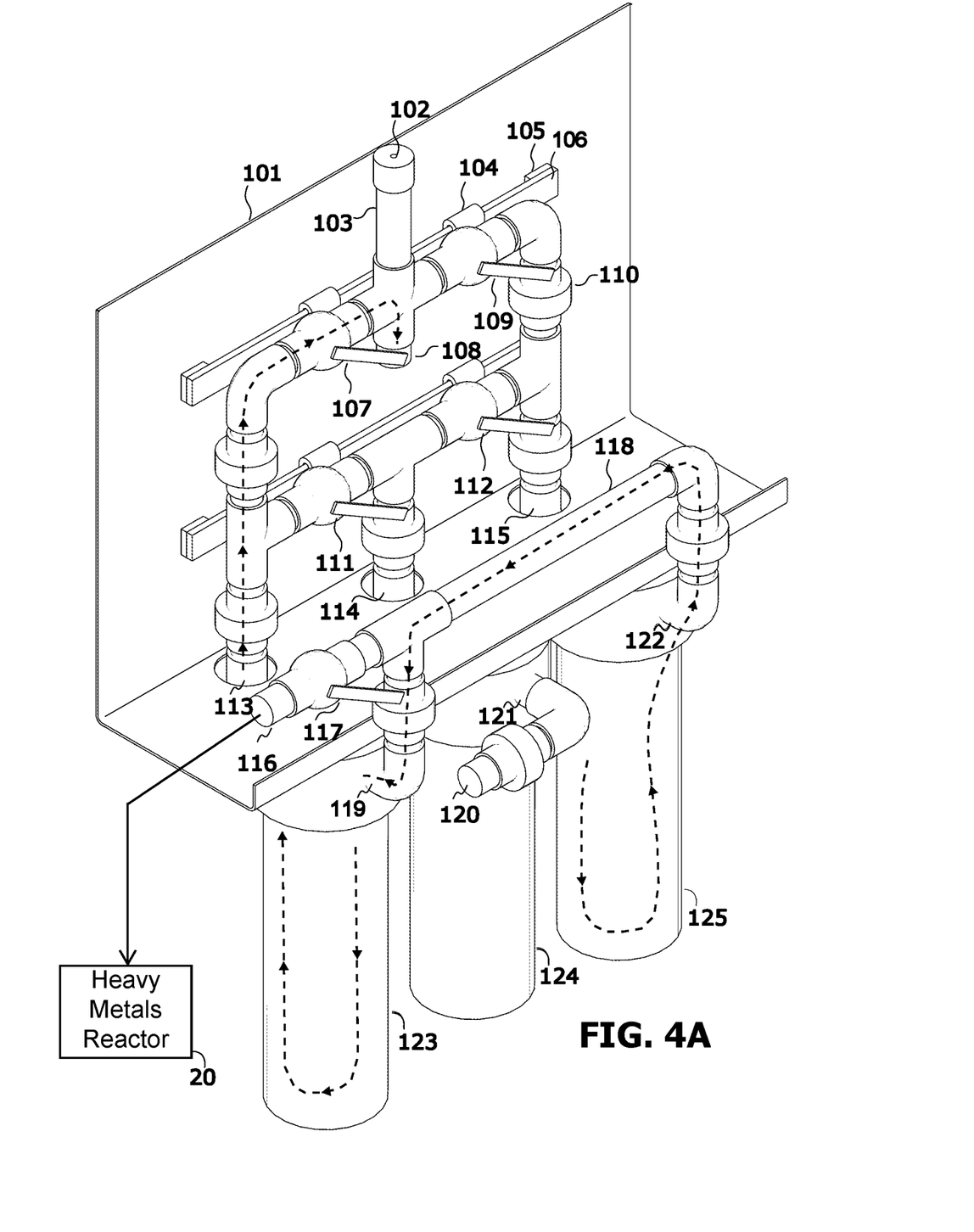
FIG. 4A is a perspective view of the filter and valve manifold assembly of FIG. 4, illustrating the internal flow of water during the back-washing operation of one of the hollow membrane filters.

For the back-wash operation, the valves 107, 111, 117 are first set to route water supplied by fine filter 125 backwards through fine filter 123 to perform a back-wash of fine filter 123 to flush accumulated debris from fine filter 123 to the backwash drain outlet connection 108, and down the drain. With the valves set for normal filtering, the valve setting changes are as follows: a) the water outlet supply valve 117 is closed to divert clean water flowing through manifold 118 so that it flows from the outlet 122 of fine filter 125 backwards into the outlet 119 of fine filter 123, and b) the pre-filtered water supply valve 111 is closed to prevent pre-filtered water from flowing from the outlet 114 of roughing pre-filter 124 to the inlet 113 of fine filter 123. Drain valve 107 is opened to allow back-wash water flowing backwards through fine filter 123 to be discharged through open drain valve 107 to the back-wash drain connected to back-wash drain outlet connection 108. These valve settings are maintained typically for several minutes to allow time for the back-flow of water through filter 123 to dislodge debris and flush it down the drain.

The fine filters 123, 125 are generally constructed of a hydrophilic material so that capillary action in the fine pores of the filter draws water into the filter pores allowing it to flow through the filter with minimal pressure drop. This creates a problem that air or other gasses that may accumulate on the inlet side of the fine filter may not readily escape, thereby creating a vapor lock condition that may greatly reduce the water flow through the filter. By providing a path to back-wash drain outlet 108 that is oriented generally in the upward direction except for the short horizontal run through valve 107, air or other gas that accumulates on the inlet side of filter 123 may percolate up through the filter inlet 113, through open valve 107, and drain vent riser 103 to escape through drain vent hole 102. This feature provides an automatic venting of accumulated air or other gas which may have collected in the filter as part of each back-wash operation.

Figure 4B:
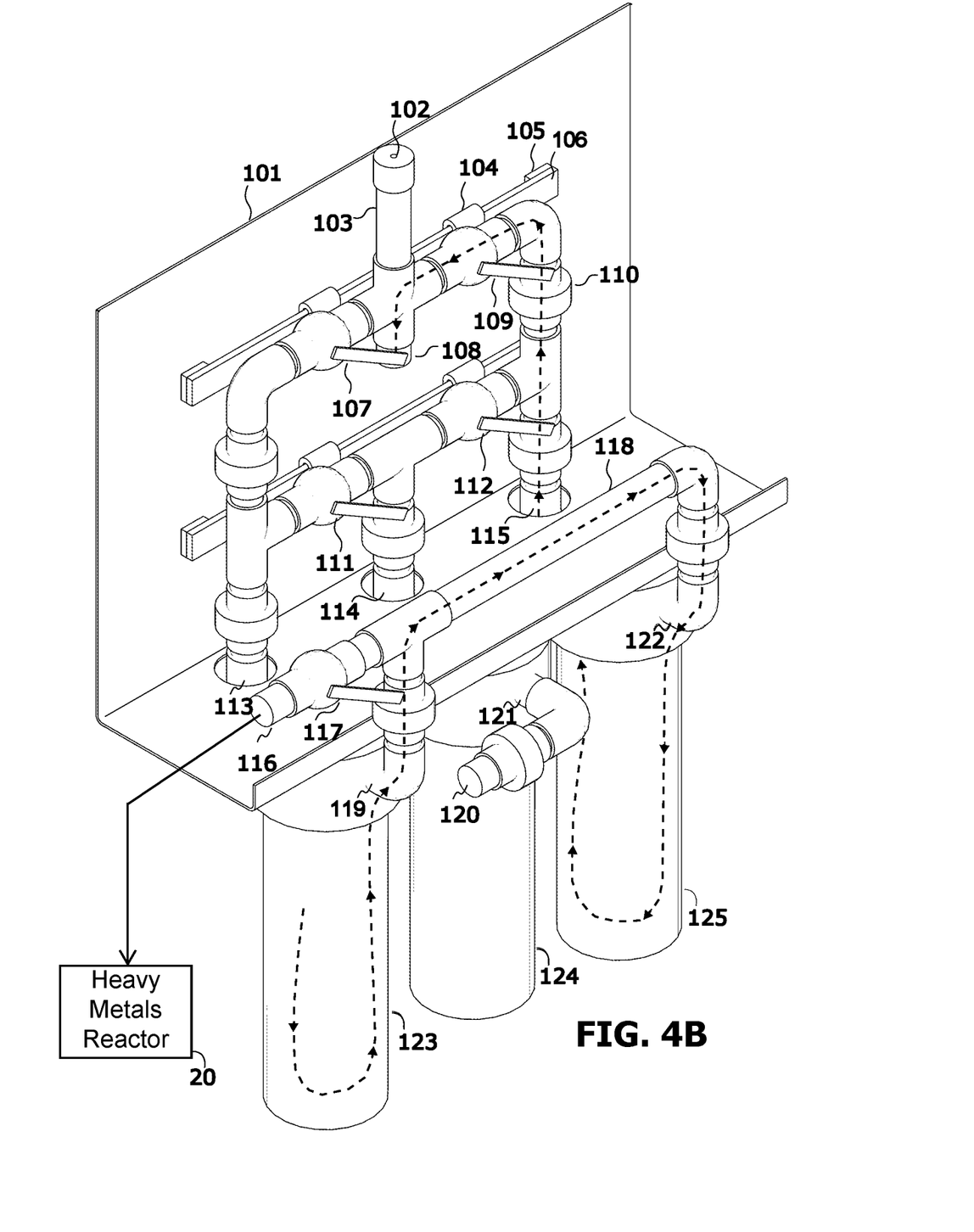
FIG. 4B is a perspective view of the filter and valve manifold assembly of FIG. 4, illustrating the internal flow of water during the back-washing operation of the other hollow membrane filter.

To back-wash the fine filter 125, clean water outlet supply valve 117 is closed or allowed to remain in its closed position and fine filter 123 is returned to normal operation by opening pre-filtered water supply valve 111 and closing back-wash drain valve 107. Then pre-filtered water supply valve 112 is closed and drain valve 109 is opened to route back-wash water flowing from the inlet 115 of fine filter 125 to flow through open drain valve 109 to the back-wash drain connected at drain outlet 108. The vent hole 102 in vent riser 103 provides venting of air or other gas from the inlet side of fine filter 125 as explained for fine filter 123. Filter 123 provides the clean water to back-wash filter 125 just as filter 125 had provided the clean water to back-wash filter 123. Normal filter operation is restored by closing drain valve 109 so that both of the drain valves and 107, 109 are closed and opening pre-filtered water supply valve 112 so that both of the pre-filtered water supply valves 111, 112 are open and clean water outlet supply valve 117 is opened so that clean water is available to users. If one of the fine filters 123, 125 is not in use, the valves may be used to route water through the fine filter that is in use to continue to supply at least some filtered water to the users of the system.

While a variety of suitable components may be utilized in the filter and valve manifold assembly 14, some components may be preferable over others based upon experience with their use. For example, full flow brass ball valves may be used since plastic valves may tend to seize and break. Rubber material, such as EPDM, which holds up well to ozone and sun exposure, may be used and recommended for rubber parts in such environments. Unions, such the one identified by 110, may be used at several locations in in the manifold and valve assembly to permit the assembly to be disassembled into small pieces to permit initial assembly, to give access for repair and to permit partial disassembly to facilitate shipping.

The back panel 101 may be fabricated from ⅛ inch thick aluminum that is sufficiently ductile to enable small radius bends. The panel 101 may be 18 inches wide and the entire assembly depicted in FIG. 2 may weigh about 10 kilograms. With partial disassembly, the filter and valve manifold assembly 14 may be transported in regulation sized checked airline luggage. The valve assembly mounting rails 106 and standoff spacers 105 may be cut from 1 inch wide by ¼ inch thick aluminum, and attached to the back plate 101 using aluminum screws. 1¼ inch lengths of EPDM rubber hose 104 having a ⅞ inside diameter may be slipped over the mounting rails and used as separators against which to clamp the valves to the mounting rails. Stainless steel band clamps (not shown) may be used to secure the valves, and thereby the valve assembly, to the mounting rails 106. The band clamps may be positioned to contact only the EPDM rubber hose and the brass valve surface so that neither the stainless bands nor the brass valve bodies may contact the aluminum, thereby minimizing electrolytic corrosion.

In a preferred embodiment, brass valves having internal pipe threads may be used, and PVC male pipe thread-to-spigot "street" adapters may be tightened into each of the two threaded pipe thread fittings on each valve using Teflon tape as a thread sealant. The typical PVC plastic pipe-to-threaded pipe adapters have a socket rather than a spigot end for the cemented PVC attachment and may require additional short lengths of PVC pipe to join them to the socket connections of the PVC elbows, tees, and crosses to which they are joined with PVC cement. This would increase the width of the pipe assembly considerably and add substantially to the tolerance in the overall length of the piping valve manifold assembly. Both the added length and the added tolerance in the dimensions of each of the subassemblies adds substantially to shipping cost and to assembly and fabrication difficulties. The PVC male pipe thread to spigot "street" adapter fittings are not available in many hardware and building supply stores but are available from plumbing supply houses. The savings resulting from their use may warrant substantial efforts to obtain them.

Figure 5:
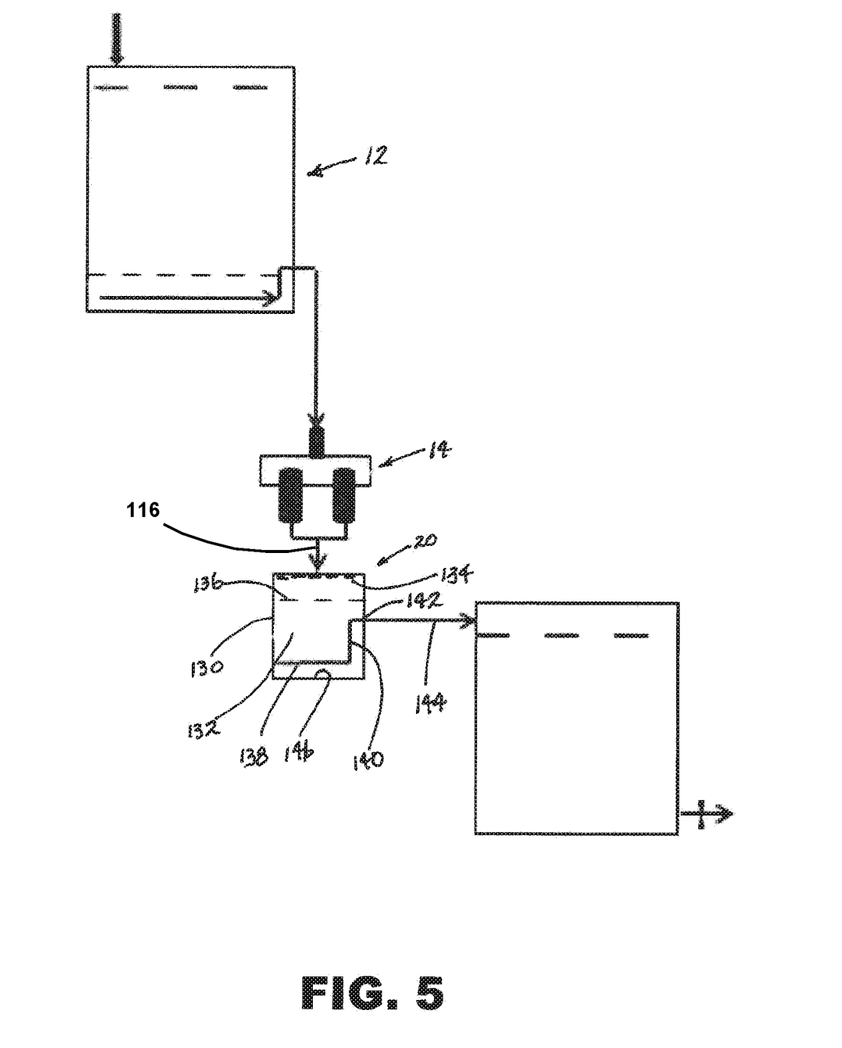
FIG. 5 is a schematic view of an in exemplary manifolded 3-stage water filtration system illustrated generally in FIG. 1, fluidly coupled with a single-stage heavy metals reactor, according to a second embodiment of the invention.

Referring to FIG. 5, a second embodiment of the invention is illustrated comprising the manifolded 3-stage water filtration system 10, i.e. the deep sand filtration assembly 12 and the filter and valve manifold assembly 14, coupled with a heavy metals reactor 20 for neutralizing heavy metals in addition to the microorganism decontamination provided by the 3-stage water filtration system 10. The water filtration system 10 is illustrated without the hydro-cyclone 18, although it may be included as illustrated in FIG. 1.

The heavy metals reactor 20 may comprise a reactor body 130 having a flow-through capacity suitable for use in a system 10 providing a selected flow of clean water. The reactor body 130 may be fabricated of a material, such as a high density polyethylene, having suitable properties for the use described herein. The reactor body 130 may be provided with a perforated collection pipe 138 located across the bottom of the reactor body 130, transitioning to a vertical pipe section 140, in turn transitioning to a reactor outlet pipe 144 extending through the discharge outlet 142.

The discharge outlet 142 may penetrate the wall of the reactor body 130. The discharge outlet 142 may be located about 25 cm above the bottom wall 146 of the reactor body 130, and below the particulate medium top surface 136. A perforated inlet pipe 134 may be located above the particulate medium top surface 136. The inlet pipe 134 may be fluidly coupled with the clean water outlet pipe 116 so that effluent from the filter and valve manifold assembly 14 may be sprinkled uniformly over the top surface 136.

The particulate medium 132 may comprise a mixture of selected proportions of silicon dioxide ($SiO_2$) sand and titanium dioxide ($TiO_2$) sand. The proportions may be selected for removal of heavy metals from bacteria free water on a daily basis for a selected time period, e.g. a selected number of months.

The $SiO_2/TiO_2$ mixture may be placed in the reactor body 130 to cover the reactor outlet pipe 144. The top surface 136 of the $SiO_2/TiO_2$ mixture may extend to about 20 cm below the top edge of the reactor body 130. The flow of water into the reactor body 130 and out the reactor outlet pipe 144 may be adjusted to maintain a level of water about 15 cm above the top surface 136.

The manifolded 3-stage water filtration system 10 may remediate raw surface water that may frequently be characterized by bacterial contamination levels equivalent to those of raw sewerage. The presence of solids and the variety of biological species may also be remediated to thereby produce water meeting or exceeding applicable drinking water standards. To summarize, turbidity levels have been reduced to essentially zero turbidity, and bacterial removal has equaled 99.9999%.

FIG. 6 illustrates a tabular summary of embodiments of the manifolded 3-stage water filtration system with and without the heavy metals reactor. The system without the heavy metals reactor may be characterized as a type I module. The system with the heavy metals reactor may be characterized as a type II module. Differing user population sizes may be categorized as "household," "facility," and "industrial." Both the "facility" category and the "industrial" category may reflect water drawn from a surface water supply or a well. The facility and industrial categories may employ either a type I or type II module depending upon whether the contaminant comprises a combination of bacteria and sediments, or a combination of bacteria, sediments, and heavy metals.

In contrast, the "household" category may be characterized by water sources consisting of surface waters, wells, or municipal water supplies, each having variable contaminant types. Consequently, the household category may employ 1 of five different module types. Nevertheless, each of the household, facility, and industrial categories may be characterized as a Point of Use (POU) system.

Household Module I may be a Point of Use (POU) system to remove contaminants from surface water sources. It may have a treatment capacity of 40-200 lpd; under intermittent operations, treatment capacity may be 40-60 lpd. The system may utilize Sand Filtration, plus Bio-Film Formation and Remediation pursuant to which pathogens are reduced by nonpathogenic bacteria. Sand Filtration may remove microorganisms down to a size of 75 microns. Bio-Film Remediation may effectuate complete reduction of pathogenic microorganisms.

Household Module II may be a POU system to remove contaminants from surface waters and municipal water supply sources. It may have a treatment capacity of 200 lpd. The system may utilize a mechanical filter for removing micro-organisms and particulate materials down to a size of 75 microns, and a pair of Hollow Fiber Filters for removing microorganisms down to a size of 0.1 micron.

Household Module III may be a POU system to remove contaminants from surface and ground water sources. It may have a treatment capacity of 200 lpd. The system may utilize a Mechanical Filter and a pair of 3-inch Hollow Fiber Filters for removing microorganism down to a size of 0.1 micron, and a $TiO_2$ Reductive Reactor, comprising a mixture of $TiO_2$ and sand, for treating heavy metal contaminants.

Household Module IV may be a POU system to remove contaminants from surface and ground water sources. It may have a treatment capacity of 200 lpd. The system may utilize Sand Filtration and a $TiO_2$ Reductive Reactor for removal of arsenic, fluoride ions, and other heavy metal contaminants. Alternatively, a metal oxide-based reductive reactor may be utilized for removal of fluoride ions.

Household Module V may be a POU system to remove contaminants from surface water sources. Under intermittent operations, treatment capacity may be 40-60 lpd. The system may utilize Sand Filtration, Bio-Film Remediation, $TiO_2$ Reductive Arsenic and Heavy Metal Reactor for removal via adsorption of arsenic and heavy metals, plus the biostat capacity of $TiO_2$ to control bio-film formation. Sand Filtration may remove microorganisms down to a size of 75 microns. Bio-Film Remediation may effectuate complete reduction of pathogenic microorganisms.

Facility Module I may be a POU system to remove contaminants from surface and groundwater sources. It may have a treatment capacity of up to 40,000 lpd, and may utilize 3-Stage Mechanical Filtration with Manifolded Operations. $1^{st}$ Stage Sand Filtration may remove microorganisms down to a size of 75 microns. $2^{nd}$ Stage Hydro-Cyclone Filtration may remove microorganisms down to a size of 50 microns. $3^{rd}$ Stage 10-inch Hollow Fiber Filters utilizing Manifolded Operations as previously described herein may remove microorganisms down to a size of 0.1 micron.

Facility Module II may be a POU system to remove contaminants from surface and groundwater sources. It may have a treatment capacity of up to 40,000 lpd, and may utilize 3-Stage Mechanical Filtration with Manifolded Operations, and a Reductive Reactor for arsenic and heavy metals removal. $1^{st}$ Stage, $2^{nd}$ Stage, and $3^{rd}$ Stage Mechanical Filtration may remove contaminants as disclosed relative to Facility Module I. Arsenic ions may be reduced to less than 5 ppb.

Industrial Module I may be a POU system to remove contaminants from surface and groundwater sources. It may have a treatment capacity of up to 100,000 lpd, and may utilize 3-Stage Mechanical Filtration with Manifolded Operations, and a Reductive Reactor for arsenic and heavy metals removal. Two sets of $3^{rd}$ Stage 10-inch 0.1 Micron Hollow Fiber Filters, each set having a dedicated Manifold, may remove microorganisms down to a size of 0.1 micron. Arsenic ions may be reduced to less than 5 ppb.

With each module, the output water quality may exceed World Health Organization standards, may result in 99.9999% bacterial removal, and may result in arsenic and heavy metals removal to less than 5 ppb.

Several points should be noted concerning the embodiments of the invention described herein. A relatively small number of functional elements are required to fabricate the water purifiers. Selected functional elements may be interchangeable among several different modules. The water purifiers are scalable to accommodate differing treatment capacities and output requirements. The water purifiers are cost-effective relative to the economic basis of each geographic area in which a water purifier will be placed.

The water purifiers may be operated without electrical power. Flows and pressures related to filtering devolve from gravitational forces and selected plumbing circuit geometries. If electric power is available, the water purifiers may be fully operational at the same or higher flow rates.

The 3-stage filtration assemblies described herein satisfy several objectives, including separation of clean water from surface water contaminants, wherein $1^{st}$ stage separation is accomplished utilizing sands with selected particle sizes providing voids of about 70 microns, $2^{nd}$ stage separation is accomplished by mechanical roughing filters preventing the passage of particulates and microorganisms having a size greater than 50 microns, and $3^{rd}$ stage separation is accomplished utilizing micro-porous membrane filters preventing the passage of particulates and microorganisms having a size greater than 0.1 micron.

The filter and valve manifold assembly 14 satisfies several objectives, including gravity-based operation, elimination of air entrapment and siphoning, and accommodation of the backwashing of membrane filters.

Heavy metals reduction satisfies several objectives, including reliance upon selective absorption and physical chemistry for removal of water borne ionic contaminants, using $TiO_2$ mixtures with other sands, and wherein fluorides are removed using $Al_2O_3$ mixtures with other sands.

Materials of construction are approved for water use, and may include HDPE containers with PVC pipe and fittings. No electricity is required for the household or facility module operation. No moving parts are utilized in module operations.

All household module final output capacities are adapted to be scalable. All facility module final output capacities are adapted to be scalable. All industrial module final output capacities are adapted to be scalable. All heavy metals module through-put capacities are adapted to be scalable.

Facility modules require hand pumping of water feed stock into a head tank for maintaining an 80 centimeters head. Facility module operations are based on 11 hours of daylight. Type I and II facility module output performance capacities are based on daily backwashing. Type I and II industrial module output performance capacities are based on daily backwashing.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A manifolded multi-stage water filtration system comprising:
    a deep sand filter assembly comprising a container, a collection pipe, and a discharge pipe, wherein the container is configured to support a layer of sand covering the collection pipe;
    a filter and valve manifold assembly comprising:
        a pre-filter fluidly coupled with the outlet conduit;
        a first hollow membrane filter fluidly coupled with the pre-filter;
        a second hollow membrane filter fluidly coupled with the pre-filter and the first hollow membrane filter and in fluid parallel arrangement with the first hollow membrane filter, wherein the pre-filter is independently fluidly coupled with both the first and second hollow membrane filters; and
        a backwash system comprising (a) a plurality of valves fluidly coupled with a plurality of pipe sections, (b) the pre-filter, (c) the first and second hollow membrane filters, (d) a backwash disposal drain, and (e) a drain vent riser comprising a drain vent opening for automatically venting of air or gas collected in the filters of the filter and valve manifold assembly, wherein the drain vent riser upwardly extends from and is fluidly connected to the backwash disposal drain;
    wherein selected ones of the plurality of valves are closable so that water for backwashing is flowable, via the pre-filter, (i) from the first hollow membrane filter to the second hollow membrane filter and to the backwash disposal drain and (ii) from the second hollow membrane filter to the first hollow membrane filter and to the backwash disposal drain; and
    wherein material from the first hollow membrane filter and the second hollow membrane filter is removable without adding contaminants to the first and second hollow membrane filters.

2. The manifolded multi-stage water filtration system in accordance with claim 1, the system further comprising a heavy metals reactor for neutralizing heavy metals in contaminated water.

3. The manifolded multi-stage water filtration system in accordance with claim 2, wherein the heavy metals reactor contains a mixture of sand and a heavy metals neutralizer, wherein the mixture of sand and the heavy metals neutralizer comprises silicon dioxide ($SiO_2$) sand and titanium dioxide ($TiO_2$) sand.

4. The manifolded multi-stage water filtration system in accordance with claim 3, wherein the heavy metals neutralizer comprises nanoparticles.

5. The manifolded multi-stage water filtration system in accordance with claim 1, wherein the backwash disposal drain is disposed above the pre-filter and the first and second hollow membrane filters.

6. The manifolded multi-stage water filtration system in accordance with claim 1, wherein the manifolded multi-stage water filtration system is gravity-operated.

7. A manifolded multi-stage water filtration system comprising:
    a deep sand filter assembly comprising a container, a collection pipe, and a discharge pipe, wherein the container is configured to support a layer of sand covering the collection pipe;
    a hydro-cyclone comprising an inlet conduit fluidly coupled with the collection pipe, an outlet conduit, and a solids discharge outlet;
    a filter and valve manifold assembly fluidly coupled to the hydro-cyclone and comprising:
        a pre-filter fluidly coupled with the outlet conduit;
        a first hollow membrane filter fluidly coupled with the pre-filter; and
        a second hollow membrane filter fluidly coupled with the pre-filter and the first hollow membrane filter and in fluid parallel arrangement with the first hollow membrane filter, wherein the pre-filter is independently fluidly coupled with both the first and second hollow membrane filters; and
        a backwash system comprising (a) a plurality of valves fluidly coupled with a plurality of pipe sections, (b) the pre-filter, (c) the first and second hollow membrane filters, (d) a backwash disposal drain, and (e) a drain vent riser comprising a drain vent opening for automatically venting of air or gas collected in the filters of the filter and valve manifold assembly, wherein the drain vent riser upwardly extends from and is fluidly connected to the backwash disposal drain; and
    a heavy metals reactor fluidly coupled to the filter and valve manifold assembly and comprising a reactor body containing a particulate medium comprising a mixture of sand and a heavy metals neutralizer;
    wherein a first quantity of particulate materials above a selected size are removable by the deep sand filter assembly;
    wherein a second quantity of particulate materials above a selected size and smaller than the selected size of the first quantity of particulate materials are removable by the hydro-cyclone;
    wherein a third quantity of particulate materials and microorganisms are removable by the filter and valve manifold assembly; and
    wherein the heavy metals reactor is configured to remove heavy metals.

8. The manifolded multi-stage water filtration system in accordance with claim 7, wherein the particulate medium comprises a mixture of silicon dioxide ($SiO_2$) sand and titanium dioxide ($TiO_2$) sand.

9. The manifolded multi-stage water filtration system in accordance with claim 8, wherein the heavy metals neutralizer comprises nanoparticles.

10. The manifolded multi-stage water filtration system in accordance with claim 7, the system further comprising a backwash system comprising (a) a plurality of valves fluidly coupled with a plurality of pipe sections, (b) the pre-filter, (c)

the first and second hollow membrane filters, and (d) a backwash disposal drain, wherein the backwash disposal drain is fluidly coupled with a drain vent opening positioned above the backwash disposal drain.

11. The manifolded multi-stage water filtration system in accordance with claim 7, wherein the manifolded multi-stage water filtration system is gravity-operated.

12. A manifolded multi-stage water filtration system comprising:
- a deep sand filter assembly comprising a container, a collection pipe, and a discharge pipe, wherein the container is configured to support a layer of sand covering the collection pipe;
- a filter and valve manifold assembly comprising:
  - a pre-filter fluidly coupled with the outlet conduit;
  - a first hollow membrane filter fluidly coupled with the pre-filter; and
  - a second hollow membrane filter fluidly coupled with the pre-filter and the first hollow membrane filter and in fluid parallel arrangement with the first hollow membrane filter, wherein the pre-filter is independently fluidly coupled with both the first and second hollow membrane filters; and
- a backwash system comprising (a) a plurality of valves fluidly coupled with a plurality of pipe sections, (b) the pre-filter, (c) the first and second hollow membrane filters, (d) a backwash disposal drain, and (e) a drain vent riser comprising a drain vent opening for automatically venting of air or gas collected in the filters of the filter and valve manifold assembly, wherein the drain vent riser upwardly extends from and is fluidly connected to the backwash disposal drain such that the drain vent opening is positioned directly above the backwash disposal drain;
- wherein selected ones of the plurality of valves are closable so that water for backwashing is flowable, via the pre-filter, (i) from the first hollow membrane filter to the second hollow membrane filter and to the backwash disposal drain and (ii) from the second hollow membrane filter to the first hollow membrane filter and to the backwash disposal drain.

13. The manifolded multi-stage water filtration system in accordance with claim 12, the system further comprising a heavy metals reactor for removal of heavy metals from water discharged from the filter and valve manifold assembly.

14. The manifolded multi-stage water filtration system in accordance with claim 13, wherein the heavy metals reactor contains a mixture of sand and a heavy metals neutralizer.

15. The manifolded multi-stage water filtration system in accordance with claim 14, wherein the heavy metals neutralizer comprises nanoparticles.

16. The manifolded multi-stage water filtration system in accordance with claim 15, wherein the manifolded multi-stage water filtration system is a point-of-use system.

17. The manifolded multi-stage water filtration system in accordance with claim 16, wherein the manifolded multi-stage water filtration system is gravity-operated.

18. The manifolded multi-stage water filtration system in accordance with claim 13, wherein the heavy metals reactor contains a mixture of silicon dioxide ($SiO_2$) sand and titanium dioxide ($TiO_2$) sand.

19. The manifolded multi-stage water filtration system in accordance with claim 12, the system further comprising a hydro-cyclone comprising an inlet conduit, an outlet conduit, and a solids discharge outlet, the inlet conduit is fluidly coupled with the collection pipe.

20. The manifolded multi-stage water filtration system in accordance with claim 12, wherein the backwash disposal drain is positioned above the pre-filter and the first and second hollow membrane filters.

\* \* \* \* \*